US007606866B2

(12) United States Patent
Mora

(10) Patent No.: US 7,606,866 B2
(45) Date of Patent: Oct. 20, 2009

(54) MESSENGER ASSISTANT FOR PERSONAL INFORMATION MANAGEMENT

(75) Inventor: Gary E. Mora, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 770 days.

(21) Appl. No.: 10/367,542

(22) Filed: Feb. 14, 2003

(65) Prior Publication Data
US 2004/0162882 A1 Aug. 19, 2004

(51) Int. Cl.
G06F 15/16 (2006.01)
(52) U.S. Cl. .................. 709/207; 709/204; 709/206; 709/224; 707/1; 707/102; 715/705; 715/703; 715/751; 715/758; 715/710
(58) Field of Classification Search ................ 709/205, 709/206–207; 455/90.2, 519, 57; 715/842, 715/851
See application file for complete search history.

(56) References Cited

U.S. PATENT DOCUMENTS 6,697,840 B1 * 2/2004 Godefroid et al. ........... 709/205
6,763,226 B1 * 7/2004 McZeal, Jr. ................. 455/90.2
6,788,949 B1 * 9/2004 Bansal ....................... 455/519
7,127,685 B2 * 10/2006 Canfield et al. ............. 715/842
2002/0022923 A1 * 2/2002 Hirabayashi et al. ........ 701/200
2003/0131023 A1 * 7/2003 Bassett et al. ............... 707/200

FOREIGN PATENT DOCUMENTS

WO      WO 01/65807      9/2001

OTHER PUBLICATIONS

Vise, David A., "AOL, HP to Sell Instant Messaging Business", The Washington Post, Jan. 23, 2003, p. E05.
Appelzeller et al., "The Mobile People Architecture", Internet Online, Jan. 1999, http://mpa.stanford.edu/publications/CSL-TR-99-777. ps.

* cited by examiner

Primary Examiner—Jude J Jean Gilles

(57) ABSTRACT

A real-time communications device, a real-time communications system of networked distributed such devices and method and program product for operating such devices. The device includes a personal information manager (PIM), an instant messenger and a Messenger Assistant. The device may also include an e-mail client. The Messenger Assistant automatically provides appointment/status information from the PIM to the instant messenger, which passes status to identified buddies. The Messenger Assistant may also monitor local presence and e-mail and update status based on local presence changes and on incoming e-mail.

39 Claims, 5 Drawing Sheets

MESSENGER ASSISTANT FOR PERSONAL INFORMATION MANAGEMENT

BACKGROUND OF THE INVENTION

1. Field of the Invention

The present invention is related to a real time communications system and more particularly to an integrated real time on-line communications system wherein distributed users can communicate with each other using any of a variety of on-line communications tools.

2. Background Description

Personal productivity applications or tools are well known and readily available for everyday use. Examples of such personal productivity tools include state of the art communications tools such as instant messaging applications and e-mail, as well as personal information manager (PIM) software. These personal productivity tools are available for a wide range of platforms that range from small hand held devices such as what are known as personal digital assistants (PDAs) and web enabled or third generation (3G) cell phones to larger personal computers (PC) and even to distributed or Internet based platforms.

Typical well known instant messaging applications include, for example, America Online (AOL) Instant Messenger (AIM) from AOL, Inc., Yahoo! Messenger from Yahoo! Inc. and MSN Messenger from Microsoft Corporation. Although instant messaging is very popular for private, somewhat intimate communications, to date instant messengers have found few valid uses in the business environment. However, "(m)any industry analysts predict that instant messaging will eclipse e-mail in the workplace as a tool for internal communication or a way to confirm transactions." Vise, David A., "AOL, HP to Sell Instant Messaging Business" *The Washington Post,* Jan. 23, 2003, page E05.

A typical e-mail client includes an inbox for receiving and managing incoming e-mails; a composition function for creating e-mailable messages; a spell checker for checking those messages; and, an address book for storing the e-mail addresses of frequent contacts. Examples of e-mail clients include Outlook and Outlook Express from Microsoft Corporation, Netscape Mail from Netscape Communications Corporation and Eudora from Qualcomm Inc. Both Palm OS based and Windows CE based PDAs also include e-mail preparation and management capability and synchronize/interface with the host desktop e-mail client. Further, PDAs with a capability of connecting to the Internet, e.g., wireless connectivity, may have a full e-mail capability with an in-box, an out-box and local storage for storing and archiving sent and received messages. E-mail is invaluable in business today and often may be the only way two remotely located people can communicate. For example, many advertisements, especially in the "Want Ads," only provide an e-mail address for inquiries and/or responses.

Normally, a PIM application is included in desktop software for most PDAs and may include a calendar, a task and/or "to do" list and, a contact list or address book. The Palm Desktop from Palm, Inc. for Palm operating system (Palm OS) is one such example for PDAs. Also some PC suites such as Outlook, for example, include a PIM that shares its contact list as an address book for e-mail. Typically, with each of these PIMs, the user enters personal information such as, scheduled meetings, deadlines and etc. Also, the user sets reminder alarms that provide an audio and/or visual notification of impending meetings or deadlines. A mainframe or Internet based system has data stored centrally and the user can authorize selective access to others for updating as well as for retrieving current calendar information. This is not possible for local PIM systems, e.g., PDA or PC based. So, while the user may have been reminded to attend a meeting, no one else may know where the user is, when he/she will return or, if the user should or shouldn't be paged. PIM systems have found such common business usage that many have expressed the feeling that, they cannot function without their PDA.

Thus, there is a need for a way to provide selected business associates with up to date personal status automatically and in real time.

SUMMARY OF THE INVENTION

It is a purpose of the invention to provide members of a selected group with up to date personal status automatically and in real time;

It is another purpose of the invention to provide business associates with up to date personal status automatically and in real time;

It is yet another purpose of the invention to selectively provide up to date personal status to selected business associates automatically and in real time;

It is yet another purpose of the invention to update personal status remotely and selectively provide business associates with up to date personal status automatically and in real time.

The present invention relates to a real-time communications device, a real-time communications system of networked distributed such devices, method and program product for operating such devices. The device includes a personal information manager (PIM), an instant messenger and a Messenger Assistant. The device may also include an e-mail client. The Messenger Assistant automatically provides appointment/status information from the PIM to the instant messenger, which passes status to identified buddies. The Messenger Assistant may also monitor local presence and e-mail and update status based on local presence changes and on incoming e-mail.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
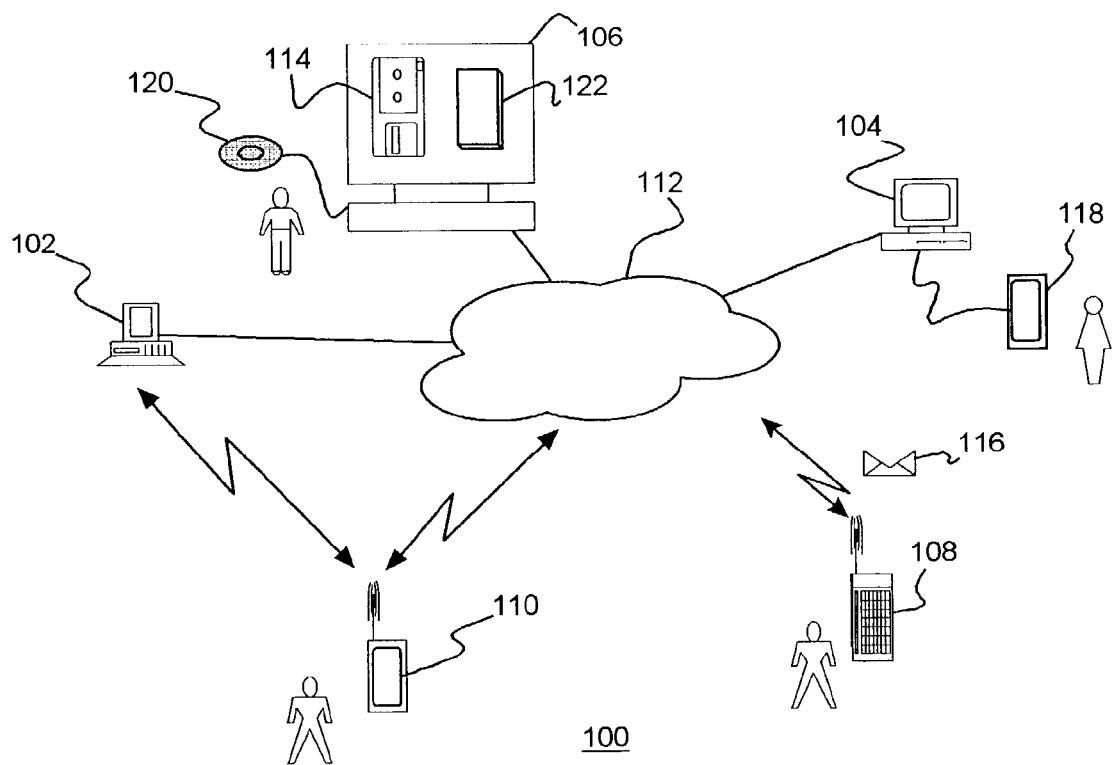
FIG. 1 shows an example of a preferred embodiment real-time communications system serving distributed users.

Turning now to the drawings and, more particularly, FIG. 1 shows an example of a preferred embodiment real-time communications system 100 serving distributed and, perhaps, distant users located in multiple countries. A Messenger Assistant resides on distributed communications devices 102, 104, 106, 108, 110 selectively provides local data, e. g., from a personal information manager (PIM) to a typical state of the art instant messenger. Typical state of the art instant messengers allow individuals to communicate instantly with identified on-line "buddies" listed in "buddy lists." Small buddy list icons visibly identify individual buddy status, e.g., off-line, on-line and active, on-line and inactive. Some instant messengers manually allow users to personalize selectable status messages and manually select when each is provided, e.g., "away from my desk," "away from home," "on vacation," "on the phone," or anything the user may select.

A preferred Messenger Assistant interfaces availability and presence information from each individual users' PIM with that users' instant messaging capabilities, automatically indicating the users' availability state to others in real time. The availability state is based on the context of information collected by the Messenger Assistant from the particular user's PIM data. Further, the Messenger Assistant communicates with state of the art e-mail to identify incoming PIM updates and automatically update each user's data and availability in response to appropriate messages.

So, this example of a real-time communications system 100 includes communications devices 102, 104, 106, 108, 110 distributed at remote locations that may include other countries. The distributed communications devices 102, 104, 106, 108, 110 are connected together over a network 112 that may be a local area network (LAN), the Internet or a combination thereof. Distributed communications devices may be personal computers 102, 104 running communications applications (e.g., 114), computer terminals 106 connected to a server (not shown) running communications applications and wireless devices such as a cell phone 108 or a personal digital assistant (PDA) 110 with wireless capability. Examples of such wireless capability may include a wireless LAN (WLAN) or a Wi-Fi connection such as an IEEE 802.11a or 802.11b adapter, a cell phone capability or card or, Bluetooth connection adapter.

Further, communications applications may include, for example, an instant messenger 114, e-mail or short message service (SMS) type capability 116, for communicating, at least, with other connected distributed communications devices 102, 104, 106, 108, 110. Also, some communications device 102, 104, 106, 108, 110 include a PIM. The PIM may be updated locally, at the particular communications device 102, 104, 106, 108, 110, e.g., from a synchronization operation with an attachable PDA 118 or, remotely from another of the communications devices 102, 104, 106, 108, 110. One or more presence sensor 120 (e.g., a motion detector, infrared or heat sensor, a video camera or web cam and etc.) may be included and located locally to a particular communications device 102, 104, 106, 108, 110. Each included optional presence sensor provides local presence/absence information about an individual user to the system 100. A Message Assistant graphical user interface (GUI) 122 is shown on terminal 106.

Registered users of a real-time communications service operating on such a real-time communications system 100, each maintain up to date information on a local personal information management system. The Messenger Assistant interfaces with the PIM, e-mail 116 to a local e-mail client and instant messenger 114, making information in the PIM available to others through the instant messenger 114 and allowing some remote management of the PIM data through e-mail/SMS 116. Preferably, the PIM, e-mail 116 and instant messenger 114 are in a single integrated application such as Microsoft (MS) Outlook from Microsoft Corporation.

Although described herein with reference to MS Outlook, it is understood that this is for example only and not intended as a limitation. It is further understood that the present invention has application to any single software application or collection of software applications capable of maintaining and communicating selected information for a particular user, e.g., interfacing the Messenger Assistant with Palm desktop and Eudora in combination with AIM. In a Linux based example, a Messenger Assistant may be combined with an industry standard vCalendar based or equivalent appointment listing application, such as KOrganizer (see, devel-home.kde-.org/~korganiz) and pmail (see, www.scottbender.net/pmail) in combination with GAIN (see, gaim.sourceforge.net). According to the present invention, each users' availability, as maintained in the PIM, is reflected in the instant messenger 114 for each user. The Messenger Assistant 122 monitors the occurrence of calendar events with unique context and automatically changes the respective user=s availability state as it is reflected to other real-time communication system users.

So, the Messenger Assistant updates user's availability state based upon a set of calendar context rules. The user, e.g., at PC 104, selects which rule or rules to enable. The user's instant messenger contacts benefit by receiving availability status automatically based on the context of appointments in the users PIM default, e.g., from PDA 118. For example a simple rule may declare that: "If the location of an appointment is not blank then show my availably state as 'Away'." So, the calendar event is displayed to selected other users with active instant messengers, e.g., users at terminal 106 in instant messenger 114, an active instant messenger on PC 102 and on wireless devices 108, 110 as well. Further, optionally, on or prior to the start time of each calendar event occurrence, the Messenger Assistant 122 sends an event notification (e.g., an alarm) to one or more messaging enabled devices for an identified user. So, for example, an event scheduled on PC 102 is sent to wireless PDA 110 as well as web enabled cell phone 108. Additionally, if an optional presence sensor 120 is included, the Messenger Assistant 122 can also update status based upon the presence/absence of a user in the vicinity of the monitor 120.

Also, the Messenger Assistant 122 monitoring incoming e-mail notifications recognizes selected information in the notifications (e.g., through the Outlook Inbox rules wizard) as altering or overriding PIM entries and updates to user's availability state. The user's instant messenger contacts receive automatic availability status because the user can remotely change availability states. Examples of such availability rules may include Away, Busy, Out To Lunch, Be Right Back and Online. The Away rule may declare: "If an email is received addressed to me from my mobile phone address and the email subject contains the word 'IM_Away'then change my availability state to 'Away'." So, for example, a calendar entry may indicate a half day meeting and return to the office at noon that meeting would be reflected on the instant messenger and automatically updated at noon. However, when it becomes apparent to the user that the meeting will run all day, the user can use web mail on cell phone 108 to send an e-mail 108 update to him/herself. The Messenger Assistant 122, aware of the incoming e-mail, responds to the message by overriding the current PIM rule to extend the instant messenger indication to show that the user is in an all day meeting.

Figure 2:
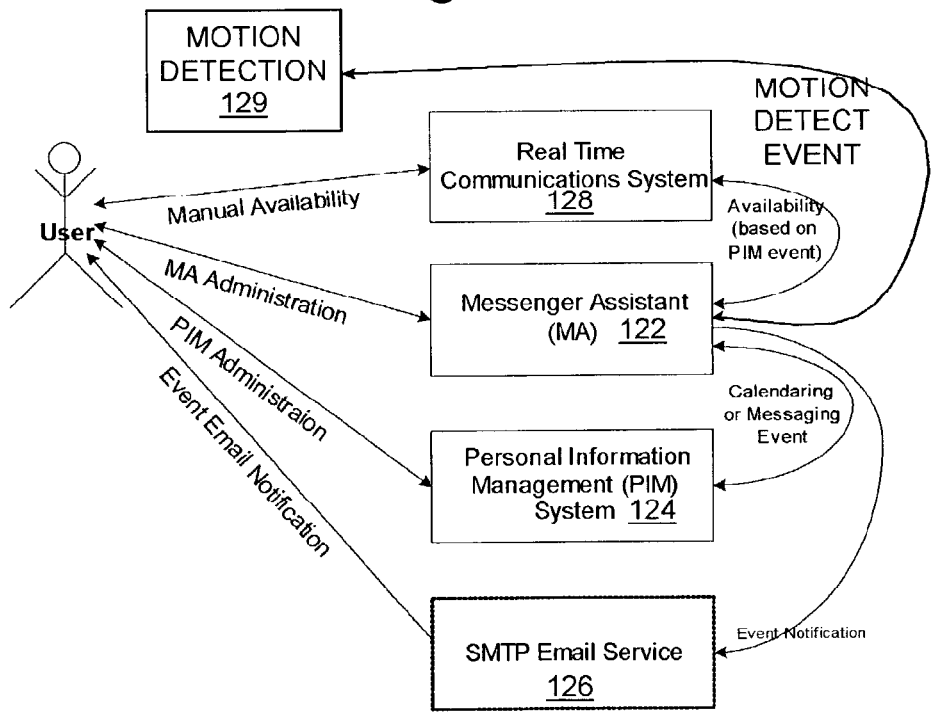
FIG. 2 shows an example of information data flow managed by the Messenger Assistant.

FIG. 2 shows an example of information data flow managed by the Messenger Assistant 122. As noted hereinabove, the Messenger Assistant 122 communicates directly with the PIM 124, the local e-mail service facility 126 or client and the real time communications system, local instant messenger 128. A presence detection application 129 passes presence information from presence detection events to the Messenger Assistant 122. In this example, the Messenger Assistant 122 sends data both to the PIM 124 and to the local e-mail service facility 126, as well as to the local instant messenger 128. Thus, the user can update the instant messenger 128 status and, the Messenger Assistant 122 communicates that update to either or both of the PIM 124 and local e-mail service facility 126, as well as passing data from each of the PIM 124 and local e-mail service facility 126 to the local instant messenger 128. Also when, for example, the presence detector (120 in FIG. 1) indicates that there is movement in its vicinity, the Messenger Assistant 122 may interpret that movement as an end to a currently scheduled event, e.g., a meeting has ended and the local user has returned to the office.

So routinely, the user maintains calendaring events in his/her PIM 124. The Messenger Assistant 122 automatically reflects his/her availability state within the real-time communications system or instant messenger 128. Also, periodically, the user can manually adjust availability in the instant messenger 128. Further, the user as well as selected or designated users (e.g., instant messenger contacts) at other distributed real-time communications system 100 can routinely view each other's availability status. Users may be designated by each individual user or at a system level with a default group of user. So, designated users (buddies) can monitor each other's availability state in the background. When a monitored buddy's state changes, a pop-up and tone can be selected to alert the user, so that each knows when another has changed availability state. Optionally, users may select buddies to monitor by checking a contact name in an Online User Area (not shown) in the GUI and pop-ups and tones are provided for state changes only for selected buddies.

Also, calendar maintenance and PIM updates can be made from remote wired or wireless devices; and, users can be notified remotely of such updates with the same wired or wireless devices, e.g., on or prior to the start time of an appointment. The user receives helpful reminders of important events while away from the office or home. Also, the user can send a notification to one or more specified email addresses with a list of all daily appointments or tasks. So, buddies can receive daily meeting summaries even while away from the office or home.

Figure 3:
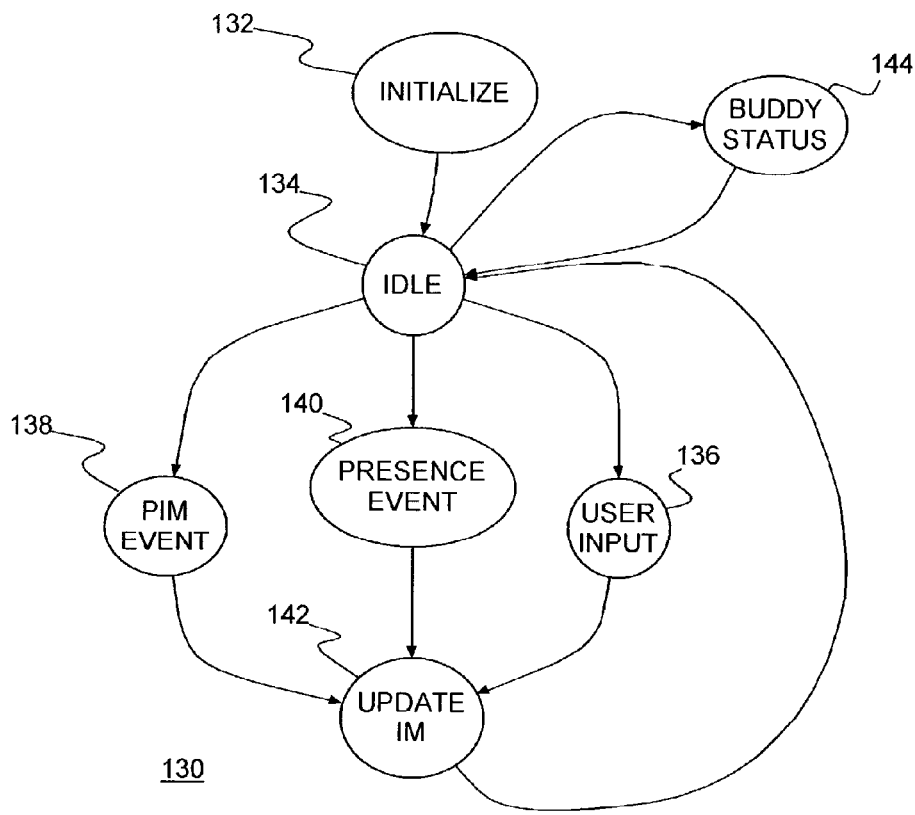
FIG. 3 shows a state diagram example of how the Messenger Assistant coordinates and interfaces PIM data, e-mails and, optional presence detection events.

FIG. 3 shows an example of a state diagram 130 of how the Messenger Assistant coordinates and interfaces PIM data, e-mails and, optional presence detection events. First, the Messenger Assistant enters an initialization state 132, either upon system start up, e.g., if the Messenger Assistant is configured to start at system startup or, when the user manually starts the Messenger Assistant. In this initialization state 132, the Messenger Assistant initializes its communications interface with the instant messenger and information or calendar interface with the PIM. During initialization 132, the Messenger Assistant retrieves the user's schedule for the current period and, optionally, the next scheduled change from the calendar. Also, the Messenger Assistant passes the user's current status to the instant messenger. Once initialized, the Messenger Assistant enters an idle state 134 until the next occurrence or scheduled occurrence of an event.

If the event is user input, then, the Messenger Assistant enters user input event state 136 to receive the manual input. If the event is the next scheduled change, the Messenger Assistant enters PIM event state 138 and retrieves the new current status. If the event is a detected presence status change, then, the Messenger Assistant enters presence event state 140 and receives the presence status change. From event states 136, 138, 140, the Messenger Assistant enters instant messenger update state 142, where the Messenger Assistant passes the updated user status to the instant messenger. If the event is a change in instant messenger buddy status, the Messenger Assistant enters IM buddy change state 144 and provides an indication of buddy status change. Once the instant messenger receives the status update or provides the indication of buddy status change, the Messenger Assistant returns to its idle state 134 until the next event occurrence.

FIGS. 4A-D show flow chart examples for each of the user input event state 136, PIM event state 138, presence event state 140 and IM buddy change state 144, respectively. So, in step 1360 of FIG. 4A, the user can select user management to configure the user interface, defining availability and notification rules. In step 1362 the user defines and selects calendar/appointment based availability rules. So, for an example of an availability rule, if the event location is "My Office" then indicate that my availability state as "BUSY." In step 1364 the user enables/disables presence detection and defines availability rules for presence detection events. So, for an example of a presence event rule, if motion is not detected for 5 minutes then indicate that my availability state as "AWAY" and indicate "On Line" when motion is detected. In step 1366, the user enables/disables simple email notification of calendar events. When definition steps 1362, 1364 and 1366 are complete, the PIM calendar is updated in step 1368. It is understood that although update steps 1362, 1364 and 1366 are shown herein as being in parallel and the results passed to the PIM calendar in a single step 1368, this is for example only. These update steps 1362, 1364 and 1366 are typically done serially at the particular user's discretion in random order at the selection of the particular user and the results of each may be passed the PIM calendar upon completion of each. Further, all three update steps 1362, 1364 and 1366 need not be done at any one user management session. At completion of user management and after passing the updates to the calendar, the Messenger Assistant enters instant messenger update state 142, passing updated user status based on the availability and notification rules to the instant messenger.

Figure 4A:
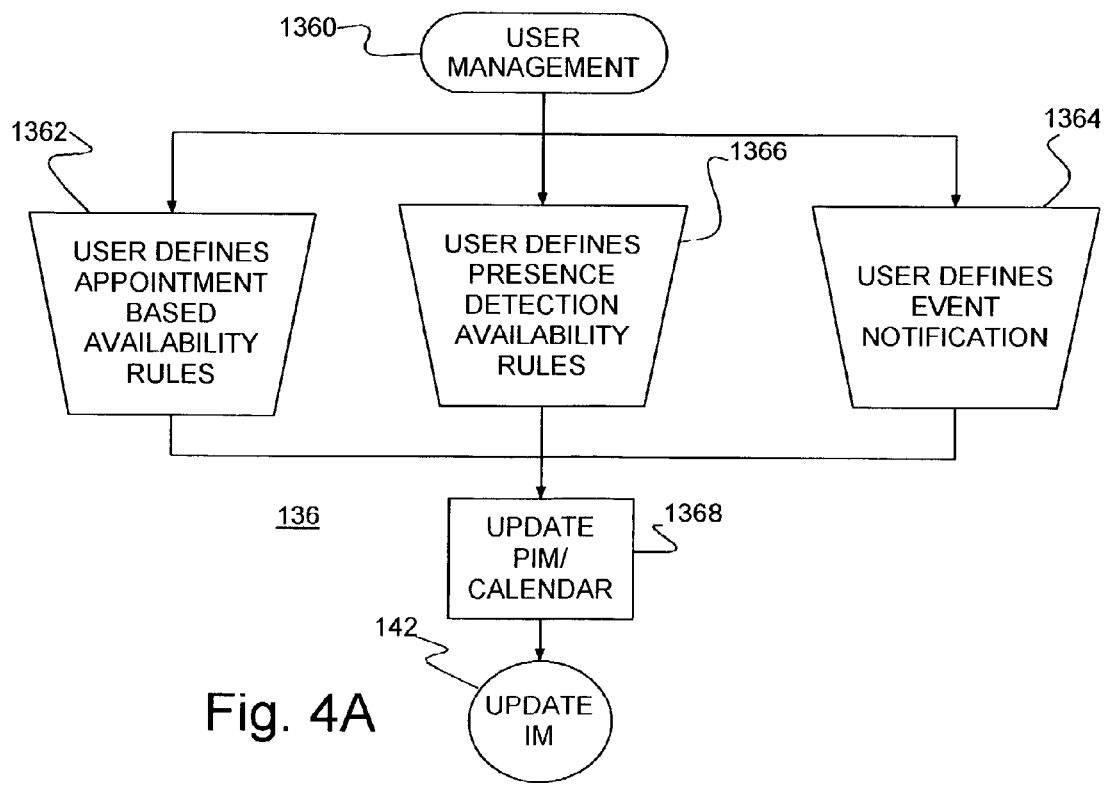
FIGS. 4A-D show flow chart examples for each of the user input event state, PIM event state, motion event state and IM buddy change state.
Figure 4B:
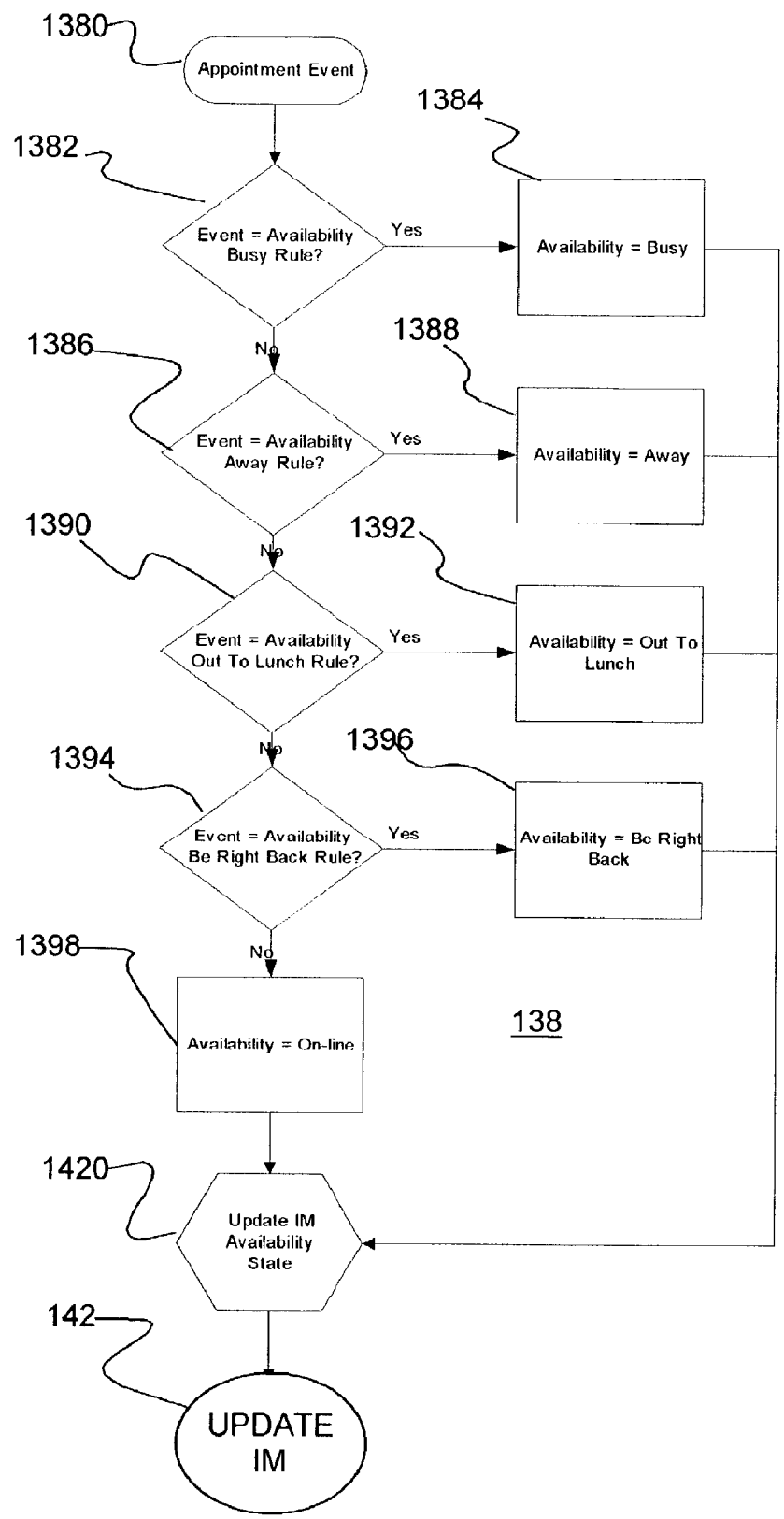

When an appointment event occurs in step 1380 of FIG. 4B, the Messenger Assistant checks the event against availability rules to determine how the instant messenger status should change. So, in step 1382 the event is checked to determine if the status should indicate that the user is busy and, if so, in step 1384 the Messenger Assistant sets availability to busy. Otherwise, in step 1386 the event is checked to determine if the status should indicate that the user is away. If the user is away, then in step 1388 the Messenger Assistant sets availability to away. Otherwise, in step 1390 the event is checked in this example to determine if the status should indicate that the user is on a lunch break. If the user is at lunch, then in step 1392 the Messenger Assistant sets availability to Out-to-Lunch. If availability still has not been identified by step 1394, the event is checked to determine if the status should indicate that the user is on a short break or, is expected to return shortly. If the Messenger Assistant estimates, from the difference between current system time and the calendar event end time, that the user's return time is near, then in step 1396 the Messenger Assistant sets availability to Be-Right-Back. Typically, the user determines the maximum time left (e.g., 5 minutes) when the availability is Be-Right-Back. If the event check is not identified with any of the available status choices, 4 in this example, then the event indicates that the user has returned and in step 1398 the Messenger Assistant sets availability to On-line, indicating that the user has returned and is available. Once availability has been set in step 1384, 1388, 1392, 1396 or 1398, the Messenger Assistant begins updating in step 1420 in instant messenger update state 142 and pass updated user availability status to the instant messenger.

Figure 4C:
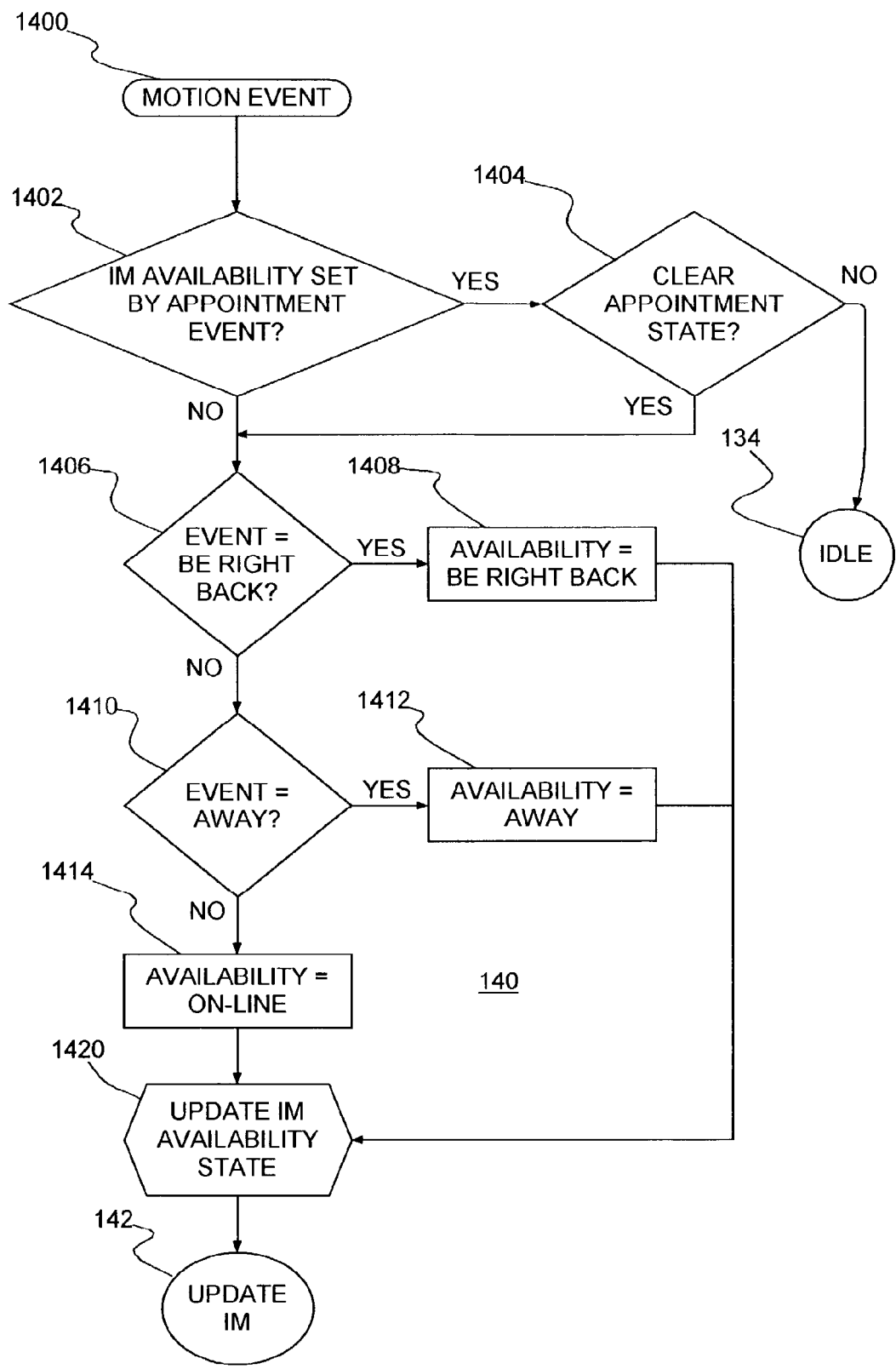

When an optional presence detection capability is included and a presence event occurs, e.g., motion is detected in step 1400 of FIG. 4C, the Messenger Assistant checks the event against availability rules to determine whether and how the instant messenger status should change. Beginning in step 1402 the availability rules are checked to determine if the status should change in response to a presence event, motion being detected in this example. So, in step 1402 if current availability is set in the instant messenger in response to an appointment, then, in step 1404 the availability rules are checked to determine if the motion event is to signal an end to the current calendar event, e.g., an end of a scheduled meeting. If the appointment state is to remain unchanged, the Messenger Assistant returns to its idle state 134. If either the current availability is not set based on a scheduled appointment or, the motion event clears the appointment state in step 1404, then in step 1406 the motion event rules are checked to determine if the status should indicate that the user is on a short break or expected to return shortly. If the estimated time of the user's return is near, then in step 1408 the Messenger Assistant sets availability to Be-Right-Back. Otherwise, in step 1410 the event is checked to determine if the status should indicate that the user is away. If the user is away, then in step 1412 the Messenger Assistant sets availability to away. If the event check coincides with none of the available status choices, 2 in this example, then the user has returned and in step 1414 the Messenger Assistant sets availability to On-line, indicating that the user has returned and is available. Once availability has been set in step 1408, 1412 or 1414, the Messenger Assistant begins updating in step 1420 to enter instant messenger update state 142 and pass updated user availability status to the instant messenger.

Figure 4D:
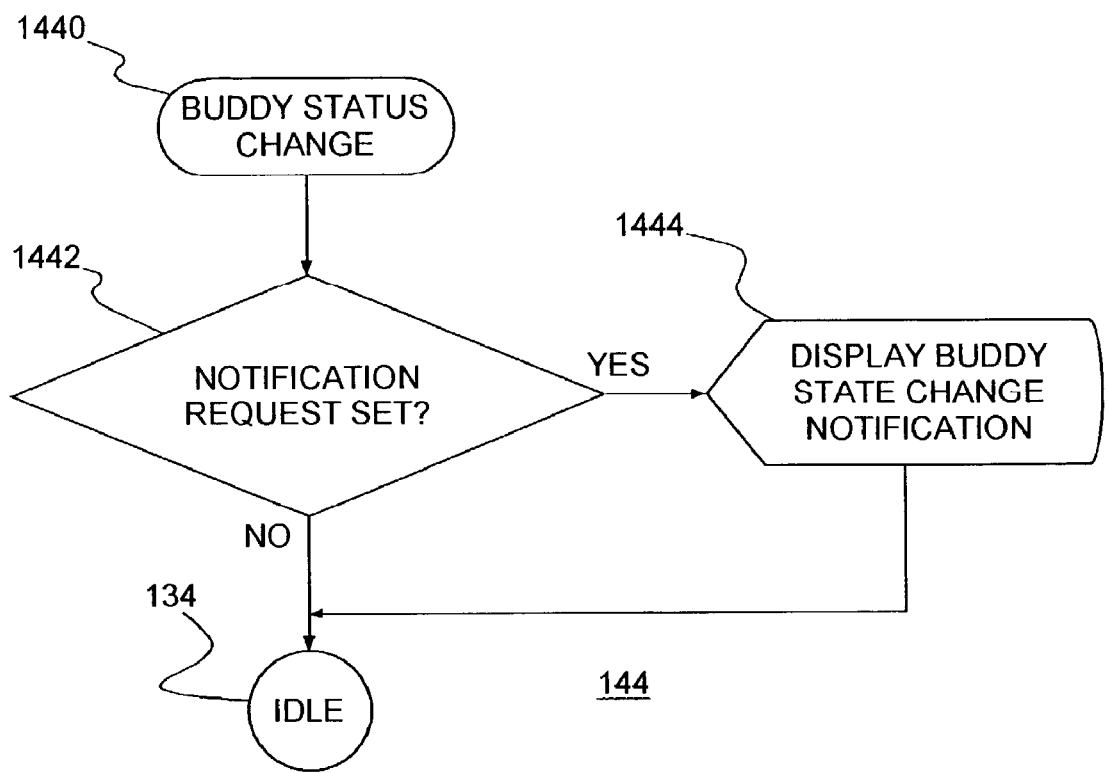

Advantageously, as shown in FIG. 4D, users can select notification for instant messenger buddy state changes for individual buddies. So in step 1440, the Messenger Assistant enters IM buddy change state 144, when the instant messenger notifies the Messenger Assistant of a buddy state change, e.g., motion has been detected in a listed buddy's office. In step 1442 the Messenger Assistant checks the buddy list to determine if the buddy identified by the instant messenger as changing corresponds to a buddy selected for a Notification Request. If not, the Messenger Assistant returns to its idle state 134. Otherwise, in step 1444 the Messenger Assistant issues the notification, e.g., sounds an alarm, flashes or any suitable alarm. As with state of the art instant messengers, alarms may be user programmable and selectable. Also, alarm length may be selectable by the user. After issuing the alarm, the Messenger Assistant returns to its idle state 134.

Accordingly, the present invention provides users with a simple and familiar way to automatically reflect availability in real-time based upon each individual user's anticipated availability as defined within the calendaring function of the user's personal information management system. Users are provided notification from familiar electronic messaging for scheduled events in the user's personal information managements system. A preferred embodiment system monitors user data for other members and triggers alerts when other members change availability. In addition, users can control availability state data from a remote location sending electronic messages, e.g., from a web enabled cell phone. Further, the present invention has application to existing telecommunications systems, providing automatic activation and deactivation of existing user mobility services by integrating interworking of existing personal information management systems and mobility services.

Advantageously, the present invention reduces the need for a user to manually activate and deactivate mobility services by using existing personal information management data to this function. It also provides in-advance notification of upcoming events within the personal information management system. This invention also provides the user with the ability to request an alert when the availability state of other members of the real-time communications system changes.

While the invention has been described in terms of preferred embodiments, those skilled in the art will recognize that the invention can be practiced with modification within the spirit and scope of the appended claims.

What is claimed is:

1. A real-time communications system comprising:
a plurality of distributed communications devices communicating with each other over a network;
an instant messenger on two or more of said plurality of distributed communications devices, each said instant messenger on said two or more providing user status information from instant messengers on one or more others other of said two or more of said plurality of distributed communications devices; and
a Messenger Assistant on each of said two or more of said plurality of distributed communications devices, said Messenger Assistant interfacing with personal information manager (PIM) data for a respective user, said Messenger Assistant providing user provided status updates to, and retrieving user status updates from, said PIM data for said respective user and providing said user status updates to a corresponding said instant messenger, wherein said user status is user presence and availability status for a user of a respective communications device, said instant messenger on said respective communications device automatically indicating availability state of said user to other instant messengers in real-time.

2. A real-time communications system as in claim 1, further comprising a PIM, said Messenger Assistant retrieving user status changes from PIM data for said PIM.

3. A real-time communications system as in claim 1, wherein an e-mail to at least one of said two or more of said plurality of distributed communications devices is a user status update, said Messenger Assistant on at least one of said ones of said distributed communications devices updating said PIM data and passing said user status update to said corresponding said instant messenger.

4. A real-time communications system as in claim 1, wherein at least one other of said plurality of distributed communications devices is a wireless communications device, said wireless communications device selectively sending said user provided status updates to one of said two or more of said plurality of distributed communications devices.

5. A real-time communications system as in claim 4, wherein said wireless communications device e-mails said user provided status updates to said one of said two or more of said plurality of distributed communications devices.

6. A real-time communications system as in claim 4, wherein said wireless communications device sends said user provided status updates as short message service (SMS) messages.

7. A real-time communications system as in claim 1, wherein said Messenger Assistant sends e-mail notifications of user status changes.

8. A real-time communications system as in claim 1, further comprising a presence detector providing presence information to at least one said Messenger Assistant, said at least one said Messenger Assistant updating said PIM data in real-time responsive to said presence information from said presence detector.

9. A real-time communications system as in claim 8, wherein said presence detector is selected from the group comprising a motion detector, an infrared sensor, a heat sensor and, a video camera.

10. A real-time communications system as in claim 1, wherein said Messenger Assistant further receives buddy status change events from said instant messenger and selectively provides a user status change notification for any selected buddy in response to a status change for said selected buddy.

11. A real-time communications system as in claim 1, wherein at least a first one of said two or more of said plurality of distributed communications devices is located in a first country and a second one is located in a second country.

12. A real-time communications system as in claim 1, wherein said network is the Internet.

13. A real-time communications device for communicating with other distributed communications devices networked together in a real-time communications system, said real-time communications device comprising:
   a personal information manager (PIM) locally storing status change data with PIM data;
   an instant messenger displaying status information available from selected other communications devices and making current status available to said selected other communications devices; and
   a Messenger Assistant interfacing with personal information manager (PIM) data, said Messenger Assistant providing user provided status updates to, and retrieving user status updates from, said PIM data for a respective user and providing status changes to said instant messenger, said instant messenger automatically indicating availability state of said respective user to other instant messengers in real-time.

14. A real-time communications device as in claim 13, further comprising an e-mail client, said Messenger Assistant receiving e-mailed status changes from said e-mail client and updating said PIM data responsive to said e-mailed status changes.

15. A real-time communications device as in claim 13, further comprising an e-mail client, said Messenger Assistant sending e-mailed status changes to said distributed communications devices.

16. A real-time communications device as in claim 13, further comprising a presence detector providing presence information to said Messenger Assistant, said Messenger Assistant updating said PIM data in real-time responsive to said presence information from said presence detector.

17. A real-time communications device as in claim 16, wherein said presence detector is selected from the group comprising a motion detector, an infrared sensor, a heat sensor and, a video camera.

18. A real-time communications device as in claim 13, wherein said Messenger Assistant further receives buddy status change events from said instant messenger and selectively provides a status change notification for any selected buddy in response to a status change for said selected buddy.

19. A real-time communications device as in claim 13, wherein said real-time communications device communicates with said selected other communications devices over the Internet.

20. A real-time communications device as in claim 13, said Messenger Assistant receiving manual input, said manual input being status changes to said PIM data and passing said status changes from said manual input to said instant messenger.

21. A method of automatically providing real-time user status to selected distributed communications devices networked together in a real-time communications system, said method comprising the steps of:
   a) retrieving current user status from personal information manager (PIM) data for a respective user;
   b) passing said current user status to an instant messenger for distribution to instant messengers for identified buddies; and
   c) waiting for a user status change event and updating said PIM data whenever said PIM data is inconsistent with said user status change event, said instant messenger automatically indicating availability state of said respective user to other instant messengers in real-time.

22. A method as in claim 21, wherein said user status change event is an appointment event and said method further comprises the steps of:
   d) identifying an availability rule for said appointment event, said availability rule providing availability status;
   e) setting said availability status as current user status; and
   f) returning to the step (b) of passing said current user status to said instant messenger.

23. A method as in claim 22, wherein said availability rule in step (d) is selected from the group of rules comprising a Busy Rule, an Away Rule, an Out to Lunch Rule and a Be Right Back Rule.

24. A method as in claim 22, wherein when current user status indicates a user is unavailable, in step (d) said availability rule is an On-Line Rule.

25. A method as in claim 21, wherein said user status change event is a presence event and whenever said PIM data is inconsistent with said presence event, said method further comprises the steps of:
   d) determining if said presence event indicates an availability change;
   e) identifying an availability rule for said appointment event, said availability rule providing availability status;
   f) setting said availability status as current user status; and
   g) returning to the step (b) of passing said current user status to said instant messenger.

26. A method as in claim 25, wherein said availability rule identified in step (e) is selected from the group of rules comprising an Away Rule, a Be Right Back Rule and an On-Line Rule.

27. A method as in claim 25, wherein the determining step (d) comprises the steps of:
   i) determining if said current user status is set by an appointment event;
   ii) determining if said presence event changes said current user status; and
   iii) continuing to step (e).

28. A method as in claim 27, wherein if said current user status is unaffected by said presence event in step (ii), step (iii) comprises returning to step (b).

29. A method as in claim 25, wherein said presence event is detection of motion.

30. A method as in claim 21, wherein said user status change event is an instant messenger buddy status change and said method further comprises the steps of:
   d) determining if said buddy status change corresponds to a selected buddy; and
   e) issuing a buddy status change notification response for each said user status change determined to correspond to a selected buddy.

31. A computer program product for communicating in real-time with a network of distributed communications devices in a real-time communications system, said computer program product comprising a computer usable medium having computer readable program code stored thereon, said computer readable program code comprising:
   computer program code means for instant messaging with other identified instant messaging buddies;

computer program code means for managing calendar information; and computer program code means for interfacing said calendar information to an instant messenger and for providing user provided status information updates to said calendar information and up to date user status information to said instant messenger, provided said user status information being passed to said instant messaging buddies, said instant messenger automatically indicating availability state of said respective user to other instant messengers in real-time.

32. A computer program product for communicating in real-time as in claim 31, wherein said computer program code means for managing calendar information comprises a personal information manager.

33. A computer program product for communicating in real-time as in claim 31, further comprising computer program code means for managing e-mail.

34. A computer program product for communicating in real-time as in claim 33, wherein said computer program code means for providing user status information, receives user status updates from e-mail, provides said user status updates to said calendar information and further provides user status information in e-mails to selected buddies.

35. A computer program product for communicating in real-time as in claim 31, further comprising computer program code means for updating said calendar information responsive to detected presence events.

36. A computer program product for communicating in real-time as in claim 31, further comprising computer program code means for providing buddy status notification responsive to instant messenger buddy status changes for selected buddies.

37. A computer-readable medium having stored thereon a plurality of instructions, the plurality of instructions including instructions which, when executed by a processor, cause the processor to:
  a) retrieve current user status from personal information manager (PIM) data for a respective user;
  b) pass said current user status to an instant messenger for distribution to instant messengers for identified buddies;
  c) wait for a user status change event;
  d) determine said change events that are appointment events;
  e) identify an availability rule for each determined appointment event, said availability rule providing availability status; and
  f) update said current user status in said PIM data with said availability status whenever said PIM data is inconsistent with said user status change event and return to step (a), said instant messenger automatically indicating availability state of said respective user to other instant messengers in real-time.

38. A computer-readable medium as in claim 37, wherein said availability rule in step (e) is selected from the group of rules comprising a Busy Rule, an Away Rule, an Out to Lunch Rule, a Be Right Back Rule and an On-Line Rule.

39. A computer-readable medium as in claim 37, wherein the plurality of instructions including instructions further causes the processor to:
  g) determine if said user status change is an instant messenger buddy status change that corresponds to a selected buddy; and
  h) issue a buddy status change notification for each said user status change determined to correspond to a selected buddy.

* * * * *